United States Patent [19]
Förster

[11] 4,183,304
[45] Jan. 15, 1980

[54] TRAFFIC SYSTEM FOR TRACK-GUIDED VEHICLES WITH STEERABLE WHEELS

[75] Inventor: Hans-Joachim Förster, Stuttgart, Fed. Rep. of Germany

[73] Assignee: Daimler-Benz Aktiengesellschaft, Fed. Rep. of Germany

[21] Appl. No.: 902,496

[22] Filed: May 3, 1978

[30] Foreign Application Priority Data

May 11, 1977 [DE] Fed. Rep. of Germany ....... 2721071

[51] Int. Cl.² ............................................... B61F 9/00
[52] U.S. Cl. .................................. 104/247; 104/119; 105/144
[58] Field of Search ............... 104/247, 242, 245, 130, 104/118, 119; 105/141, 144

[56] References Cited

U.S. PATENT DOCUMENTS

| | | | |
|---|---|---|---|
| 3,570,407 | 3/1971 | Burch | 104/242 |
| 3,643,601 | 2/1972 | Taylor et al. | 104/119 |
| 3,712,238 | 1/1973 | Colovas et al. | 104/130 |
| 3,913,491 | 10/1975 | Auer, Jr. et al. | 104/130 |

FOREIGN PATENT DOCUMENTS

2438186 5/1975 Fed. Rep. of Germany ........... 104/130

Primary Examiner—Joseph F. Peters, Jr.
Assistant Examiner—Ross Weaver
Attorney, Agent, or Firm—Craig and Antonelli

[57] ABSTRACT

A traffic system in which the cross-guide device in the operating position thereof is arranged immovably in the transverse direction relative to the axle body of the vehicle axle having steerable wheels and is constructed so sturdily itself as also as regards its suspension that the vehicle can be form-lockingly track-guided and/or laterally displaced also without deflection of the steerable wheels by way of the cross-guide device without damage and in an operationally reliable manner; force-measuring devices for determining the lateral forces exerted on the cross-guide device are arranged in the suspension of the cross-guide device while the force- and movement-transmitters are so constructed that the steerable wheels are automatically deflected always so as to maintain a predetermined desired value of the lateral force at the cross-guide device.

11 Claims, 1 Drawing Figure

U.S. Patent
Jan. 15, 1980
4,183,304
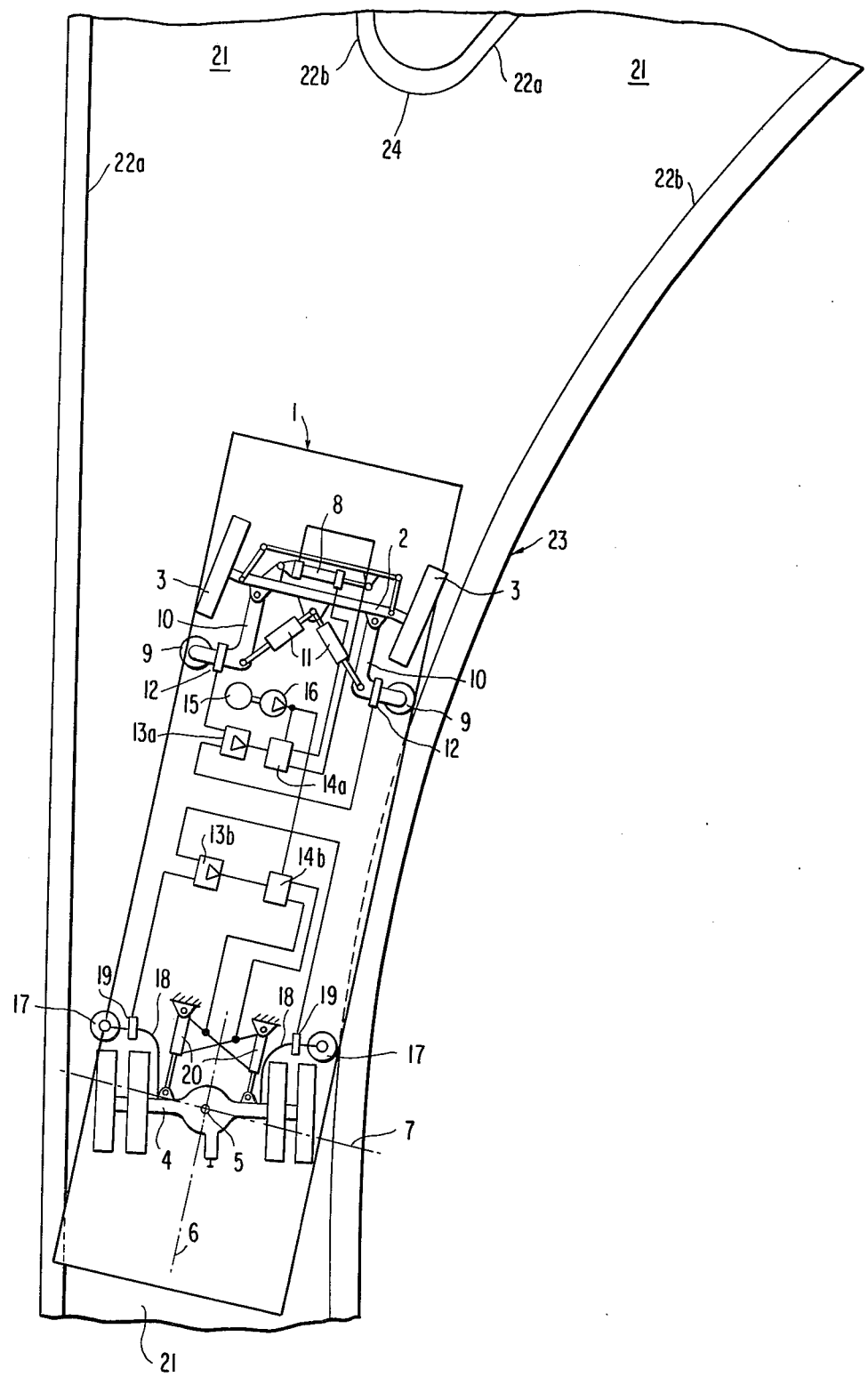

TRAFFIC SYSTEM FOR TRACK-GUIDED VEHICLES WITH STEERABLE WHEELS

The present invention relates to a traffic system, especially to a system for the public local passenger traffic for track-guided vehicles with steerable wheels, in which at least one guide groove, guide web or the like predetermining the vehicle track and adapted to be mechanically detected is arranged on the side of the road and at least one transverse guide device following the guide groove course, especially a cross-guide roller, is arranged on the vehicle side, whereby interactions between the guide groove and the transverse guide device are adapted to be transmitted onto the steerable wheels under interconnection of a force- and movement-transmission mechanism fed by an auxiliary energy in such a manner that the vehicle follows unilaterally only a single guide groove flank or only a single guide web.

Traffic systems of this type (compare, for example, the German Auslegeschrift No. 2, 127, 088) which follow unilaterally only one guide web, have the advantage that they are able to get along with passive switch systems. In the known traffic system, a cross guide roller is rigidly connected with a respective deflectable wheel each of the steerable vehicle axle and the hydraulic cylinder of the servo-steering system of the vehicle is unilaterally prestressed toward one vehicle side with predetermined pressure difference. As a result thereof, the vehicle approaches or crowds unilaterally a guide web. With a non-permissive approaching of the vehicle at the guide web, the cross-guide roller is forced off toward the vehicle center by reason of this relative displacement of the vehicle relative to the guide web and therewith a change of the deflection of the steerable wheels is immediately adduced. Consequently, a relative displacement of the vehicle relative to the determinative guide web is necessary for each steering correction. With continuing lateral interfering or disturbing forces, for example, in case of a lateral wind or in case of centrifugal forces when driving through a curve, a higher lateral guide force has to be produced by the steerable wheels than with a non-disturbed drive. However, the increased lateral guide force can be produced only with stronger deflection of the steerable wheels; this stronger deflection of the steerable wheels is again possible only by reason of a laterally displaced transverse position of the vehicle relative to the guide web as compared to a normal, undisturbed drive. Though a stable driving operation is possible with the steering system of the prior art traffic system, the relative cross position of the vehicle relative to the guide web is dependent on the magnitude of lateral interference or disturbance forces. The greater a lateral interference or disturbance force, the more strongly the vehicle will distance itself in the disturbed steady state condition of the vehicle from an undisturbed normal position as regards the transverse direction. Especially within the area of bifurcations or road mergers, transverse displacements may occur as a result thereof to a non-permissively strong extent so that an operationally safe guidance of the vehicle may be impaired under certain circumstances during the occurrence of continuing lateral forces.

It is the aim of the present invention to indicate an arrangement in which the transverse deviations of the vehicle from a normal position is as slight as possible during the occurrence of continuing lateral forces.

The underlying problems are solved according to the present invention in that the transverse guide device in the operating position is arranged immovably in the transverse direction relative to the axle member of the vehicle axle having steered wheels and is constructed so strong itself as also as regards its suspension that the vehicle can be form-lockingly track-guided and/or laterally displaced in a harmless and operationally safe manner by way of the cross guide device—also without deflection of the steerable wheels—in that force-measuring devices for determining the lateral forces exerted on the transverse guide device are arranged in the suspension of the transverse guide device, and in that the force- and movement-transmitter is so constructed that the steerable wheels are always deflected automatically for the preservation of a certain predetermined desired value of the lateral force at the transverse guide device. Since the deflection of the steerable wheels now no longer takes place in dependence on the adjusting path of the transverse guide rollers—the latter are arranged immovably at the vehicle—but instead in dependence on the lateral force on the transverse guide roller, lateral displacements for the adaptation of the vehicle steering system to higher lateral guide forces are no longer required. A fine-sensitive force measurement is also possible—in relation to the existing application—independent of path or travel by means of commercially available force-measuring cells.

In order to be able to adapt the vehicle system to the desired driving direction when passing through passive switching places in which a guide web is always missing on one side, the vehicle system is appropriately symmetrically constructed for left-side and right-side track guidance. In order to be able to get along also in curves with as small as possible a track width, appropriately all vehicle axles are steerable. For the transition to road drives, the cross guide rollers can be constructed retractable and— in case of steerable rear axles—the same can be constructed lockable in the straight driving direction by conventional means.

Accordingly, it is an object of the present invention to provide a vehicle traffic system, especially a local passenger traffic system, which avoids by simple means the aforementioned shortcomings and drawbacks encountered in the prior art.

Another object of the present invention resides in a traffic system, especially a local public passenger traffic system, which assures an operationally reliable guidance of the vehicle during the occurrence of continuing lateral forces.

A further object of the present invention resides in a traffic system of the type indicated above in which transverse deviations of the vehicle from a normal position are kept as small as possible even during the occurrence of continuing lateral forces.

A still further object of the present invention resides in a traffic system which is simple in construction, utilizes relatively few, simple parts and is highly reliable in operation for its intended purposes.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic plan view on a passive switch with a vehicle constructed in accordance with the present invention.

Referring now to the single FIGURE of the drawing, the bus generally designated by reference numeral 1 which is disposed on the switch generally designated by reference numeral 23, includes a front axle 2 with individually deflectable front wheels 3 as well as a rigid rear axle 4 which is pivotal as a whole about the pivot center point 5 with respect to the normal transverse line 7.

The pivot point 5 lies on the center longitudinal axis 6 of the vehicle. The front deflectable steering wheels are adapted to be deflected by the adjusting cylinder 8.

Cross guide rollers 9 are arranged to the rear of the front wheels 3 on mounting arms 10 on both sides of the vehicle. The mounting arms 10 which are retractable or extensible into the illustrated operationally ready position by means of the adjusting cylinders 11, are non-yieldingly retained in the operationally ready position by means of any conventional abutments (not shown). Pressure cells 12 of any known type are arranged in the mounting arms 10, which measure the lateral guide forces acting laterally on the cross guide rollers 9 and which produce in corresponding lines connected to the outputs of the pressure cells a suitable signal corresponding in magnitude to the measured force.

In front of the rear wheels, cross guide rollers 17 are mounted in a similar manner by way of mounting arms 18 rigidly secured at the axle body of the rear axle. Force-measuring cells 19 are also arranged in these mounting arms 18, which determine the lateral guide force that acts on the rear guide rollers 17 and produce a correspondingly large signal in the respective line connected to the outputs thereof. The rear axle is pivotal by way of the two adjusting cylinders 20 which are hydraulically connected oppositely with respect to one another.

On the road side, the traffic system is formed by a road surface 21 which is delimited on the right side and on the left side groove-like or channel-like by one guide web 22a on the left side and by one guide web 22b on the right side which cooperate with the transverse guide rollers 9 and 17 of the vehicle and thereby determine the track of the vehicle.

An adjustment mechanism of the vehicle steering system fed with an auxiliary energy is provided in the vehicle. A hydraulic pump 16 driven by the motor 15 supplies the auxiliary energy. The outputs of the force-measuring cells 12 and 19 are fed to amplifiers 13a and 13b which in turn influence a controller 14a and 14b of any conventional construction. Only one of the two vehicle sides or the corresponding force-measuring cells are always adapted to be selectively connected with the corresponding amplifier input utilizing conventional means. The controllers or regulators 14a and 14b possess the characteristic that so much auxiliary energy is fed to the adjusting cylinders 8 and 20 coordinated thereto and the auxiliary energy is supplied in such a direction that the signal fed to the input of the amplifiers 13a and 13b always corresponds to an adjustable desired value.

OPERATION

The operation of a vehicle steering system equipped in such a manner is now as follows:

In the illustrated bifurcation operation, the outputs of the force-measuring cells 9 and 12 of the right vehicle side are connected to the inputs of amplifiers 13a and 13b whereby, for example, a desired value for the lateral guide force of about 500 to 1,000 N may be adjusted in the system. By reason of the behavior of the two controllers 14a for the front axle and 14b for the rear axle, the adjusting cylinders 8 and 20 are so acted upon that lateral guide forces directed toward the right occur at the two vehicle axles 2 and 4 and the vehicle approaches or crowds the right guide web 22b both in front as also at the rear. More particularly, the corresponding vehicle wheels do not run exactly tangentially or parallelly to the guide web 22b but instead for the purpose of producing a lateral guide force directed toward the right, they run with a small acute angle pointing forwardly—with an inclined running angle. This inclined running angle is determined according to the present invention, for example, not by the transverse position of the vehicle relative to the determining guide web 22b but instead by the lateral guide force of the guide force rollers 9 and 17 determined in the force-measuring cells 12 and 19. With a decreasing lateral guide force the inclined running angle is increased whereas with an increasing lateral guide force it is reduced. Owing to the characteristics of the force-measuring cells, these changes of the lateral guide force can proceed practically independently of travel. This means that notwithstanding possible fluctuations of the lateral guide forces and corresponding changes of the inclined running angle of the steered wheels, the vehicle nonetheless follows very accurately and true to the configuration of the determining guide web 22b. As a result thereof, the danger is far-reachingly precluded that the vehicle during the bifurcation comes in contact on its left side with fixed parts of the road—for example by reason of non-permissively strong fluctuations of the relative position of the vehicle transversely to the guide web 22b.

The accurate maintenance of a predetermined track also permits without difficulty, notwithstanding large and continuous as well as alternating lateral disturbance forces, on the side of the road in the traffic system of the present invention, greater width tolerances as regards the transverse distance of the oppositely disposed guide webs 22a and 22b.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A traffic system, comprising on the side of the road at least one road guide means operable to be mechanically detected and predetermining the track, and on the vehicle side at least one transverse guide means following the road guide means, the interactions between road guide means and the transverse guide means being operable to be transmitted to steerable wheels under interconnection of a force and movement transmission means fed with auxiliary energy in such a manner that the vehicle follows unilaterally only a single road guide means, characterized in that the vehicle transverse guide means in its operating position is arranged substantially immovably relative to an axle member of the vehicle axle having steering wheels and is constructed so sturdily itself as also as regards its suspension that also without deflection of the steerable wheels the vehicle can be form-lockingly track-guided and laterally displaced in a damage-free operationally safe manner by way of the transverse guide means, in that force-measuring means for determining the lateral forces exerted on the transverse guide means are arranged in the suspension of the transverse guide means, and in that the force and movement transmission means are so constructed that the steerable wheels are always automatically deflected so as to maintain a predetermined desired value of the lateral force at the transverse guide means.

2. A traffic system according to claim 1, for track-guided vehicles with steerable wheels, characterized in that the transverse guide means includes transverse guide roller means.

3. A traffic system according to claim 1 or 2, characterized in that the vehicle is constructed symmetrically for the left-side and right-side track guidance and is operable to be selectively switched to one of the two sides.

4. A traffic system according to claim 3, characterized by control means for selectively connecting the outputs of the force-measuring means of only one vehicle side with the force and movement transmission means.

5. A traffic system according to claim 4, characterized in that the transverse guide means are constructed retractable and extensible.

6. A traffic system according to claim 5, characterized in that all vehicle axles are steerable.

7. A traffic system according to claim 6, characterized in that the front wheels of the vehicle are individually steerable by way of independent wheel suspensions and the rear axle is a rigid axle pivotal about a pivot axis disposed substantially in the vehicle longitudinal center plane.

8. A traffic system according to claim 1 or 2, characterized by control means for selectively connecting the outputs of the force-measuring means of only one vehicle side with the force and movement transmission means.

9. A traffic system according to claim 1 or 2, characterized in that the transverse guide means are constructed retractable and extensible.

10. A traffic system according to claim 1 or 2, characterized in that all vehicle axles are steerable.

11. A traffic system according to claim 10, characterized in that the front wheels of the vehicle are individually steerable by way of independent wheel suspensions and the rear axle is a rigid axle pivotal about a pivot axis disposed substantially in the vehicle longitudinal center plane.

* * * * *